United States Patent
Du et al.

(10) Patent No.: US 11,906,011 B2
(45) Date of Patent: Feb. 20, 2024

(54) MAGNETORHEOLOGICAL FLUID PARTICLE IMPACT DAMPER

(71) Applicant: UNIVERSITY OF SHANGHAI FOR SCIENCE AND TECHNOLOGY, Shanghai (CN)

(72) Inventors: Yanchen Du, Shanghai (CN); Junwen Lin, Shanghai (CN)

(73) Assignee: UNIVERSITY OF SHANGHAI FOR SCIENCE AND TECHNOLOGY, Shanghai (CN)

( * ) Notice: Subject to any disclaimer, the term of this patent is extended or adjusted under 35 U.S.C. 154(b) by 419 days.

(21) Appl. No.: 17/383,802

(22) Filed: Jul. 23, 2021

(65) Prior Publication Data

US 2021/0348669 A1    Nov. 11, 2021

Related U.S. Application Data

(63) Continuation of application No. PCT/CN2020/122636, filed on Oct. 22, 2020.

(30) Foreign Application Priority Data

Jan. 13, 2020 (CN) .......................... 202010033026.1

(51) Int. Cl.
    *F16F 13/00* (2006.01)
(52) U.S. Cl.
    CPC .......... *F16F 13/00* (2013.01); *F16F 2222/12* (2013.01); *F16F 2224/045* (2013.01); *F16F 2228/066* (2013.01)

(58) Field of Classification Search
    CPC .. F16F 13/00; F16F 2222/12; F16F 2224/045; F16F 2228/066; F16F 9/535
    See application file for complete search history.

(56) References Cited

FOREIGN PATENT DOCUMENTS

CN    102052423 A  *  5/2011
CN    108253075 A  *  7/2018   ............ F16F 9/3207
(Continued)

*Primary Examiner* — Xuan Lan Nguyen
(74) *Attorney, Agent, or Firm* — WPAT, P.C.

(57) ABSTRACT

Disclosed is a magnetorheological fluid particle impact damper, which includes a damper cavity unit, wherein the damper cavity unit is provided with an electromagnetic coil in a circumferential direction, the damper cavity unit is internally provided with a plurality of horizontal shock absorbers in a uniform manner, and the left and right ends of the damper cavity unit are symmetrically provided with disc-type shock absorbers; the shock absorbers and the disc-type shock absorbers are respectively connected to the inner wall of the damper cavity unit through springs; the horizontal shock absorber includes a horizontal magnetorheological fluid cavity filled with magnetorheological fluid, the horizontal magnetorheological fluid cavity is internally provided with a horizontal impactor container, the horizontal impactor container is internally provided with a first impactor group consisting of several impactors of different sizes; the disc-type shock absorber comprises a disc-type magnetorheological fluid cavity which is filled with magnetorheological fluid; the disc-type magnetorheological fluid cavity is slidably connected to a plurality of disc-type impactor containers, and the disc-type impactor containers are distributed in a circular array and internally provided with a second impactor group; and the present disclosure effectively improves the vibration reduction effect.

10 Claims, 2 Drawing Sheets

(56) References Cited

FOREIGN PATENT DOCUMENTS

| CN | 108708928 A | * | 10/2018 | ............ | F16F 9/3207 |
| CN | 109654324 A | * | 4/2019 | .............. | F16F 9/535 |

* cited by examiner

MAGNETORHEOLOGICAL FLUID PARTICLE IMPACT DAMPER

TECHNICAL FIELD

The present disclosure relates to the technical field of impact damper, in particular to a magnetorheological fluid particle impact damper.

BACKGROUND

The impact damper belongs to the passive control technology of vibration. The main working principle is the damper which realizes momentum exchange and structural energy dissipation through the collision and friction between the impactors, and between the impactor and the receiving cavity. It is characterized by simple structure, convenient manufacturing, low cost, no power supply, small changes to the original system, and it adapts to various harsh environments.

In recent years, the impact damper has developed rapidly, but the principle of vibration reduction is mainly based on the energy exchange and friction energy dissipation during the collision, and most of the monomer impact damper has short working time, few collisions, and moderate vibration reduction effects. Secondly, traditional particle dampers are composed of particles of the same size and have a small number of collisions under external excitation, resulting in poor energy dissipation.

SUMMARY

One objective of the present disclosure is to provide a magnetorheological fluid particle impact damper to solve the problems existing in the prior art mentioned above, which can effectively improve the damping effect.

To achieve the above object, the present disclosure provides the following solution: the present disclosure provides a magnetorheological fluid particle impact damper, which includes a damper cavity unit, the damper cavity unit is provided with an electromagnetic coil in a circumferential direction; the damper cavity unit is internally provided with a plurality of horizontal shock absorbers in a uniform manner, the left and right ends of the damper cavity unit are symmetrically provided with disc-type shock absorbers, the outer diameter of the disc-type shock absorber is smaller than the inner diameter of the damper cavity unit; the horizontal shock absorber and the disc-type shock absorber are respectively connected to the inner wall of the damper cavity unit through springs;

the horizontal shock absorber includes a horizontal impactor, which is connected to an inner wall of the damper cavity unit through a spring; the horizontal impactor is internally provided with a horizontal magnetorheological fluid cavity; the horizontal magnetorheological fluid cavity is internally provided with the horizontal impactor container; and the horizontal impactor container is internally provided with a first impactor group consisting of several impactors of different sizes;

the disc-type shock absorber includes a disc-type impactor, which is connected to an inner wall of the damper cavity unit through a spring; the disc-type impactor is internally provided with a disc-type magnetorheological fluid cavity; the disc-type magnetorheological fluid cavity is slidably connected to a plurality of disc-type impactor containers, and the disc-type impactor container is distributed in a circular array; the disc-type impactor container is internally provided with a second impactor group; and the horizontal magnetorheological fluid cavity and the disc-type magnetorheological fluid cavity are both filled with magnetorheological fluid.

Preferably, the damper cavity unit is a cylindrical structure, and the disc-type shock absorber is circular; a plurality of the horizontal shock absorbers are uniformly distributed in a circular array inside the damper cavity unit.

Preferably, the horizontal shock absorber further includes a chute, and the horizontal impactor is slidably connected to the chute.

Preferably, the first impactor group comprises a plurality of first impactors and a plurality of second impactors; the first impactors are spaced apart from the second impactors and arranged concentrically on a same track; the first impactors are arranged at the left and right ends of the horizontal impactor container; the size of the first impactors is larger than the size of the second impactors; and the second impactor group comprises a plurality of third impactors; and the horizontal impactor further includes two first damping rods, and the two first damping rods are respectively arranged on left and right sides of the horizontal impactor container; one end of the first damping rod is connected to the first impactor, and the other end of the first damping rod is in contact with the magnetorheological fluid in the horizontal magnetorheological fluid cavity.

Preferably, the bottom of the horizontal impactor container is provided with a slide rail, and the first impactor and the second impactor are slidably connected to the slide rail.

Preferably, the disc-type magnetorheological fluid cavity comprises an inner ring and an outer ring, and the inner ring is connected to the bottom of the outer ring; the disc-type impactor container is arranged at a groove between the inner ring and the outer ring; and two ends of the disc-type impactor container are respectively fixedly connected to a second damping rod, and the disc-type impactor container is in contact with the magnetorheological fluid in the disc-type magnetorheological fluid cavity through the second damping rod.

Preferably, the spring is a variable stiffness spring.

Preferably, the magnetorheological fluid is composed of three parts: soft magnetic particles, carrier fluid, and additives.

Preferably, the first impactor group and the second impactor group are both composed of several pulleys and particles, and the particles are composed of one or more of ceramic, quartz stone, metal, and concrete, and the diameter of the particles is 5-50 mm.

Preferably, the size of the output magnetic field of the electromagnetic coil can be adjusted.

The present disclosure realizes the following technical effects:

(1) The present disclosure controls the viscosity of the magnetorheological fluid in each magnetorheological fluid cavity by changing the size of the magnetic field, and realizes the control of the vibration efficiency between the impactor and the main system. By controlling the vibration efficiency, the vibration absorption range can be effectively increased and the vibration absorption ability of different environments and different equipment can be satisfied;

(2) The present disclosure uses two different-sized impactors arranged at intervals, which can reach a stable state faster under the action of external excitation, reduces the peak displacement and acceleration of vibration and effectively improves the vibration reduction effect;

(3) The present disclosure limits the position of the disc-type shock absorber through six springs, which can provide tuning stiffness in different directions and effectively realize the transmission and dissipation of vibration energy of the main structure in each direction.

BRIEF DESCRIPTION OF THE DRAWINGS

In order to illustrate more clearly the embodiments of the present disclosure or the technical scheme in the prior art, the drawings required in the embodiment are briefly described below. Obviously, the drawings described below are only some embodiments of the present disclosure, and for ordinary technicians in the field, other drawings may be obtained on the basis of these drawings without paying creative labour.

among them, 1. A electromagnetic coil; 2. A damper cavity unit; 3. A first spring; 4. A horizontal impactor housing; 5. A horizontal magnetorheological fluid cavity; 6. A horizontal impactor container; 7. A first damping rod; 8. A first piston; 9. A first pulley; 10. A first particle; 11. A second pulley; 12. A second particle; 13. A second spring; 14. A disc-type impactor housing; 15. A chute; 16. A second piston; 17. A second damping rod; 18. A disc-type magnetorheological fluid cavity; 19. A disc-type impactor container; 20. A third pulley; and 21. A third particle.

DETAILED DESCRIPTION OF THE EMBODIMENTS

The technical scheme in the embodiment of the present disclosure will be clearly and completely described below in conjunction with the attached drawings in the embodiment of the present disclosure. Obviously, the described embodiments are only a part of the embodiments of the present disclosure, but not all of the embodiments. Based on the embodiments of the present disclosure, all other embodiments obtained by ordinary technicians in the field without making creative efforts shall fall within the protection scope of the present disclosure.

In order to make the foregoing objects, features, and advantages of the present disclosure more comprehensible, the present disclosure is further explained in detail below in combination with the attached drawings and the specific embodiment.

Figure 1:
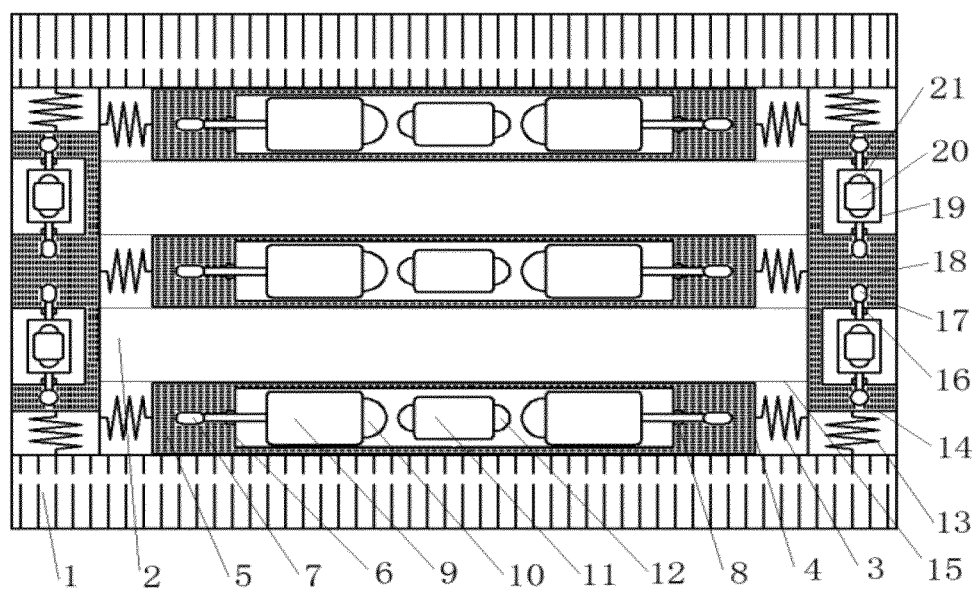
FIG. 1 is a schematic diagram of the structure of the magnetorheological fluid particle impact damper of the present disclosure.
Figure 2:
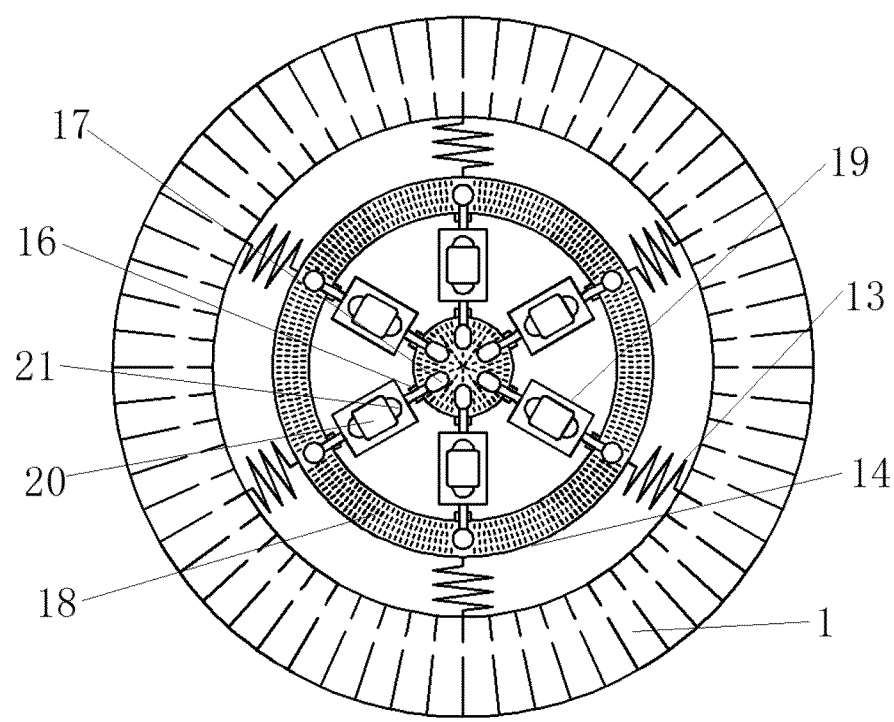
FIG. 2 is a side view of the magnetorheological fluid particle impact damper of the present disclosure.

As shown in FIG. 1-2, this embodiment provides a magnetorheological fluid particle impact damper, which includes a damper cavity unit 2, the damper cavity unit 2 is a cylindrical structure; the damper cavity unit 2 is provided with an electromagnetic coil 1 in a circumferential direction, and the damper cavity unit 2 is uniformly provided with a plurality of horizontal shock absorbers therein; in this embodiment, the number of horizontal shock absorbers is four, four horizontal shock absorbers are uniformly distributed in a circular array inside the damper cavity unit 2, and the horizontal shock absorbers are spaced at an angle of 90°; the left and right ends of the damper cavity unit 2 are symmetrically provided with disc-type shock absorbers, respectively, the disc-type shock absorbers are circular, and the outer diameter of the disc-type shock absorber is smaller than the inner diameter of the damper cavity unit 2; the horizontal shock absorbers and the disc-type shock absorbers are respectively connected to the inner wall of the damper cavity unit 2 through springs.

The horizontal shock absorber includes a horizontal impactor, and the horizontal impactor includes a horizontal impactor housing 4. The left and right ends of the horizontal impactor housing 4 are fixedly connected to the first springs 3, respectively. The horizontal impactor housing 4 is fixedly connected to the inner wall of the damper cavity unit 2 through the first spring 3.

The horizontal impactor housing 4 is sleeved with a horizontal magnetorheological fluid cavity 5, and the horizontal magnetorheological fluid cavity 5 is filled with magnetorheological fluid; the magnetorheological fluid is covered with a horizontal impactor container 6.

The horizontal impactor container 6 is internally provided with a first impactor group, and the first impactor group includes a plurality of first impactors and second impactors, and the first impactors and the second impactors are spaced apart and arranged concentrically on the same track, the first impactors are arranged at the left and right ends of the horizontal impactor container 6.

The horizontal impactor further includes two first damping rods 7, which are respectively arranged on the left and right sides of the horizontal impactor container 6.

The first impactor includes a first pulley 9 and a first particle 10, and one end of the first damping rod 7 is fixedly connected to the first pulley 9; the other end of the first damping rod 7 is in contact with magnetorheological fluid in the horizontal magnetorheological fluid cavity 5; the left and right ends of the first pulley 9 are fixedly connected to the first damping rod 7 or the first particle 10; the second impactor includes a second pulley 11 and a second particle 12, the left and right ends of the second pulley 11 are respectively connected to the second particles 12; the size of the first pulley 9 is larger than the size of the second pulley 11; the size of the first particles 10 is larger than the size of the second particles 12.

A first piston 8 is provided at the junction of the first damper rod 7 and the side wall of the horizontal impactor container 6 for sealing.

The horizontal shock absorber further includes a chute 15, the horizontal impactor housing 4 is slidably connected to the chute 15, and the freedom of movement of the horizontal impactor housing 4 is restricted by the chute 15.

The bottom of the horizontal impactor container 6 is provided with a slide rail, the first pulley 9 and the second pulley 11 slide on the slide rail to ensure that the first impactor and the second impactor have a central collision with each other. There is no possibility of collision with the upper and lower walls of the horizontal impactor container 6, thereby ensuring that the impact actions are all effective impacts, and the efficiency of momentum exchange is higher.

The disc-type shock absorber includes a disc-type impactor, and the disc-type impactor includes a disc-type impactor housing 14. The disc-type impactor housing 14 is fixedly connected to a plurality of second springs 13 in a circumferential direction. The disc-type impactor housing 14 is fixedly connected to the inner wall of the damper cavity unit 2 through the second spring 13. In this embodiment, the number of the second springs 13 is six, which, by limiting the position of the disc-type impactor housing 14 by six second springs 13, is capable of providing different tuning stiffness on a plane composed of six second springs 13.

The disc-type impactor housing 14 is sleeved with a disc-type magnetorheological fluid cavity 18, and the disc-type magnetorheological fluid cavity 18 is filled with magnetorheological fluid.

The disc-type magnetorheological fluid cavity 18 is slidably connected to a plurality of disc-type impactor container 19, and the disc-type impactor container 19 is distributed in a circular array; the disc-type magnetorheological fluid cavity 18 comprises an inner ring and an outer ring, and the inner ring is connected to the bottom of the outer ring, the disc-type impactor container 19 is arranged at a groove between the inner ring and the outer ring; the two ends of the disc type impactor container 19 are respectively fixedly connected to a second damping rod 17, the disc-type impactor container 19 is in contact with the magnetorheological fluid in the disc-type magnetorheological fluid cavity 18 through the second damping rod. In this embodiment, the number of the disc-type impactor containers 19 is six, and corresponds to the positions of the six second springs 13.

A second piston 16 is provided at the junction of the second damping rod 17 and the side wall of the magnetorheological fluid cavity 18 for sealing.

The disc-type impactor container 19 is internally provided with a second impactor group, and the second impactor group includes a plurality of third impactors; the third impactor includes a third pulley 20, and the two ends of the third pulley 20 are fixedly connected to third particles 21.

In a further optimization scheme, the size of the output magnetic field of the electromagnetic coil 1 can be adjusted, and the change of the output magnetic field of the electromagnetic coil 1 can be used to control the viscosity of the magnetorheological fluid in the horizontal magnetorheological fluid cavity 5 and the disc-type magnetorheological fluid cavity 18, thereby achieving the purpose of controlling the vibration efficiency between the impactor and the main system.

In a further optimization scheme, the first spring 3 and the second spring 13 are variable stiffness springs. When the variable stiffness spring transfers the energy of the main structure to the damper by resonance, it can rapidly reduce the vibration energy of the high-order modes of the basic structure, and improve the energy dissipation efficiency of the damper.

In a further optimized solution, the first particles 10, the second particles 12, and the third particles 21 are composed of one or more of ceramic, quartz, metal, and concrete. The diameter of the first particle 10, the second particle 12, and the third particle 21 is 5-50 mm; the distance between the first impactor and the second impactor is 5-10 mm; and the first impactor group in the horizontal plane projection area is 20%-40% of the horizontal plane of the damper cavity unit 2.

The working principle of the magnetorheological fluid particle impact damper of the present disclosure is:

The electromagnetic coil 1, which is arranged on the outer periphery of the damper cavity unit 2, outputs a magnetic field of controllable size. By adjusting the size of the magnetic field, the viscosity of the magnetorheological fluid in the horizontal magnetorheological fluid cavity 5 and the disc-type magnetorheological fluid cavity 18 is changed to achieve the purpose of controlling the vibration efficiency between the impactor and the main system; the vibration damping range of the vibration efficiency control device can meet different vibration environments and different equipment's damping capabilities; the horizontal shock absorber is connected to the side wall of the damper cavity unit 2 through the first spring 3, and the position of the horizontal shock absorber is restricted by the chute 15, so that the horizontal shock absorber can move intelligently in the horizontal direction, which effectively avoids the collision with the inner wall of the damper cavity unit 2; the horizontal impactor container 6 is internally provides with a impactor group, and the impactor pulley slides through the slide rail to ensure that only a center collision occurs between the impactors, and the collision between the pulley and the upper and lower walls of the horizontal impactor container 6 are avoided, thus effectively ensuring that the impact between the impactors is all effective impact, and the efficiency of momentum exchange is higher, and the collision energy is transmitted to the horizontal magnetorheological fluid cavity 5 through the damping rod, and the magnitude of the impact energy transferred to the main system from the impactors is controlled by changing the viscosity of the magnetorheological fluid in the horizontal magnetorheological fluid cavity 5; the impactor group adopts two different sizes of impactors arranged at intervals, so that the sphere center of the impactor particles collide with each other, which can reach a stable state faster under external excitation, and reduces the peak displacement and peak acceleration of vibration; the position of the disc-type shock absorber is limited by six second springs 13, which can provide different tuning stiffness on the plane composed of six second springs 13, thus realizing the transfer and dissipation of vibration energy of the main structure in all directions.

In the description of the present disclosure, it should be understood that the azimuth or position relationship indicated by the terms "longitudinal", "transverse", "upper", "lower", "front", "rear", "left", "right", "vertical", "horizontal", "top", "bottom", "interior", "outer", etc. is based on the orientations or positional relationships shown in the drawings. It is simply to facilitate the description of the present disclosure, and not to indicate or imply that the device or element referred to must have a specific orientation, be constructed and operated at a specific orientation, therefore, it can not be understood as a limitation to the present disclosure.

The embodiments described above are only for describing the preferred mode of the present disclosure, and are not intended to limit the scope of the present disclosure. Without departing from the design spirit of the present disclosure, the various deformations and improvements made by ordinary technicians in the field to the technical scheme of the present disclosure shall fall within the scope of protection determined by the claims of the present disclosure.

What is claimed is:

1. A magnetorheological fluid particle impact damper, comprising a damper cavity unit (2), wherein the damper cavity unit (2) is provided with an electromagnetic coil (1) in a circumferential direction; the damper cavity unit (2) is internally provided with a plurality of horizontal shock absorbers in a uniform manner, the left and right ends of the damper cavity unit (2) are symmetrically provided with disc-type shock absorbers, the outer diameter of the disc-type shock absorber is smaller than the inner diameter of the damper cavity unit (2); the horizontal shock absorbers and the disc-type shock absorbers are respectively connected to the inner wall of the damper cavity unit (2) through springs;

the horizontal shock absorber comprises a horizontal impactor, which is connected to an inner wall of the damper cavity unit (2) through a spring; the horizontal impactor is internally provided with a horizontal magnetorheological fluid cavity (5); the horizontal magnetorheological fluid cavity (5) is internally provided with a horizontal impactor container (6); and the horizontal impactor container (6) is internally provided with a first impactor group consisting of several impactors of different sizes;

the disc-type shock absorber comprises a disc-type impactor, which is connected to an inner wall of the damper cavity unit (2) through a spring; the disc-type impactor is internally provided with a disc-type magnetorheological fluid cavity (18); the disc-type magnetorheological fluid cavity (18) is slidably connected to a plurality of disc-type impactor containers (19), and the disc-type impactor container (19) is distributed in a circular array; the disc-type impactor container (19) is internally provided with a second impactor group; and the horizontal magnetorheological fluid cavity (5) and the disc-type magnetorheological fluid cavity (18) are both filled with magnetorheological fluid.

2. The magnetorheological fluid particle impact damper according to claim 1, wherein the damper cavity unit (2) is a cylindrical structure, and the disc-type shock absorber is circular; a plurality of the horizontal shock absorbers are uniformly distributed in a circular array inside the damper cavity unit (2).

3. The magnetorheological fluid particle impact damper according to claim 1, wherein the horizontal shock absorber further comprises a chute (15), and the horizontal impactor is slidably connected to the chute (15).

4. The magnetorheological fluid particle impact damper according to claim 1, wherein the first impactor group comprises a plurality of first impactors and a plurality of second impactors; the first impactors and the second impactors are spaced apart and arranged concentrically on a same track; the first impactors are arranged at the left and right ends of the horizontal impactor container (6); the size of the first impactors is larger than the size of the second impactors; and the second impactor group comprises a plurality of third impactors; and the horizontal impactor further comprises two first damping rods (7), and the two first damping rods (7) are respectively arranged on left and right sides of the horizontal impactor container (6); one end of the first damping rod (7) is connected to the first impactor, and the other end of the first damping rod (7) is in contact with the magnetorheological fluid in the horizontal magnetorheological fluid cavity (5).

5. The magnetorheological fluid particle impact damper according to claim 4, wherein the bottom of the horizontal impactor container (6) is provided with a slide rail, and the first impactor and the second impactor are slidably connected to the slide rail.

6. The magnetorheological fluid particle impact damper according to claim 1, wherein the disc-type magnetorheological fluid cavity (18) comprises an inner ring and an outer ring, and the inner ring is connected to the bottom of the outer ring; the disc-type impactor container (19) is arranged at a groove between the inner ring and the outer ring; and two ends of the disc-type impactor container (19) are respectively fixedly connected to a second damping rod (17), and the disc-type impactor container (19) is in contact with the magnetorheological fluid in the disc-type magnetorheological fluid cavity (18) through the second damping rod.

7. The magnetorheological fluid particle impact damper according to claim 1, wherein the spring is a variable stiffness spring.

8. The magnetorheological fluid particle impact damper according to claim 1, wherein the magnetorheological fluid consists of three parts: soft magnetic particles, carrier fluid, and additives.

9. The magnetorheological fluid particle impact damper according to claim 1, wherein the first impactor group and the second impactor group are both composed of several pulleys and particles, and the particles are composed of one or more of ceramic, quartz stone, metal, and concrete, and the diameter of the particles is 5-50 mm.

10. The magnetorheological fluid particle impact damper according to claim 1, wherein the size of the output magnetic field of the electromagnetic coil (1) can be adjusted.

* * * * *